Dec. 23, 1930.     T. C. WEISS     1,785,798
MOTOR DRIVEN TOOL
Filed April 20, 1929
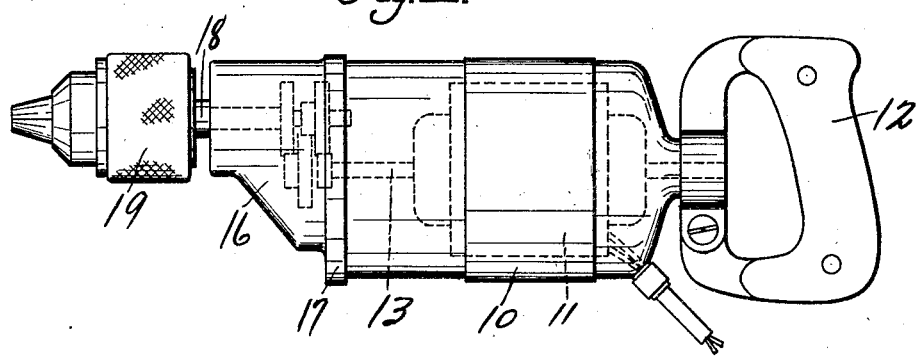
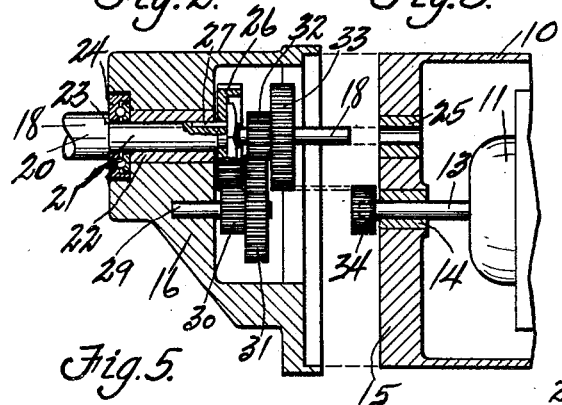 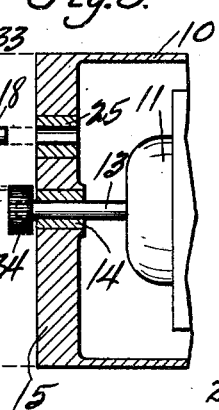 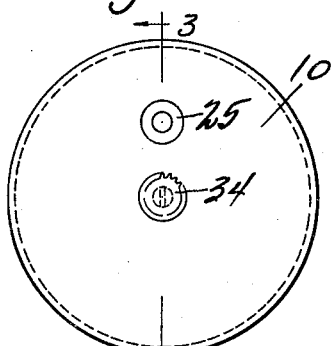
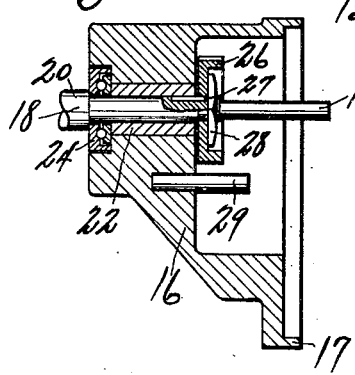 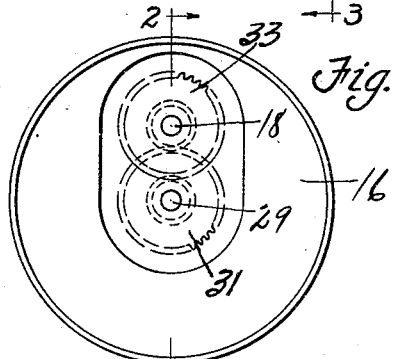
INVENTOR.
Theobald C. Weiss.
BY
ATTORNEY.

Patented Dec. 23, 1930

1,785,798

UNITED STATES PATENT OFFICE

THEOBALD C. WEISS, OF SOUTH BEND, INDIANA, ASSIGNOR TO ELECTRIC SPRAYIT COMPANY, OF SOUTH BEND, INDIANA

MOTOR-DRIVEN TOOL

Application filed April 20, 1929. Serial No. 356,868.

The invention relates to motor driven tools, and particularly to portable electric drills, and has for its object to provide a device of this character having a reduction gearing unit forming the head end of the tool and comprising a gear casing, shafts, gearing and chuck, said unit being readily detachable from the motor casing of the tool and easily accessible for inspection and repairs.

A further object is to provide a device of this character having a speed reduction gearing unit constructed and arranged to cooperate with the motor and its casing in a manner whereby the inner end of the chuck spindle shaft carrying a part of the gearing and removable with the unit is provided with a bearing carried by the end wall of the motor casing from which the unit is detachable, thus providing a double bearing for said shaft, as distinguished from similar tools in which the arrangement of the gearing and shaft is such as to prevent the provision of a double bearing.

A further object is to provide a device of this character having a speed reduction gearing assembly in which the intermediate gears are mounted on a shaft for rotation independent of the shaft, said gearing being arranged whereby the shaft and the gears mounted thereon rotate in the same direction, thus reducing friction between the shaft and gears to a minimum.

A further object is to provide a device of this character having a motor carrying casing, and a gear housing detachably carried by the motor casing, the motor shaft carrying a pinion at one end thereof adapted to mesh with one of the gears of the gear train when the gear housing is mounted on the motor casing, whereby, in the attachment or detachment of the gear housing to or from the motor casing, no manipulation of parts other than the means for securing the casing and housing together is necessary to establish connection or effect disconnection between the operative parts independently carried by the casing and the housing.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a view in side elevation of an electric drill with my reduction gearing unit secured thereto in assembled operative position.

Figure 2 is a longitudinal sectional view of the reduction gearing housing showing the arrangement of the gearing therein, taken on line 2—2 of Figure 6.

Figure 3 is a fragmentary longitudinal sectional view of the motor casing taken on line 2—2 of Figure 4.

Figure 4 is an end view of the motor casing.

Figure 5 is a longitudinal sectional view of the gear housing taken on line 2—2 of Figure 6 and showing the loosely mounted gears removed therefrom.

Figure 6 is an end view of the gear housing showing the arrangement of the gearing therein.

Referring to the drawing, which illustrates the invention as applied to an electric drill, the numeral 10 designates a motor casing in which is mounted the electric motor 11, and at the rear end of which is mounted a handle 12. The shaft 13 of the motor is journaled at its ends in bearings carried by the motor casing, one of the bearings (not shown) being mounted in the reduced diameter end of the casing carrying the handle, and the other bearing 14 being mounted in the forward end wall 15 of the motor casing.

A gear housing 16 having a circular marginal flange 17 formed at one end thereof is detachably carried by the forward end of the motor casing, said flange encircling said casing. A chuck spindle shaft 18, parallel to and spaced from the motor shaft, extends through the housing and projects therefrom at both ends, the forward end of said shaft carrying a drill holding chuck 19, and the rear end of said shaft being journaled in the bearing 25 carried by the forward wall 15 of the motor casing. The shaft 18 is of varied diameters, the portion 20 thereof projecting from the forward end of the housing being larger than the portion 21 thereof journaled in the bearing 22 carried by the housing, and the shoulder 23 formed at the rear end of the portion 20 bears against the bearing member 24 mounted in the housing to prevent binding of the shaft.

A gear 26 is mounted on the shaft 18 at the forward end of the housing, and is keyed thereto by means of the key 27, said gear having a recess formed in one side thereof in which a nut 28 threaded on the shaft 18 is adapted to fit to hold the gear in proper position. Mounted in and projecting from the housing into the gear receiving portion thereof and preferably in axial alignment with the motor shaft 13 is a stud 29 on which is loosely mounted a compound gear, the small gear 30 of said compound gear meshing with the gear 26. The large gear 31 of the compound gear mounted on the stud 29 meshes with the small gear 32 of a compound gear mounted on the shaft 18 and adapted for rotation independent of said shaft, the large gear 33 of said last named compound gear meshing with a pinion 34 mounted on the projecting end of the motor shaft 13. The pinion 34 is preferably detachably mounted on the shaft 13 as with a tongue and groove connection.

The housing 16, the shaft 18, and the gear train with the exception of the pinion 34, are thus arranged in one unitary construction, all of which is readily removable from the motor casing and thus easily accessible for inspection and repairs. The shaft 18 is adapted to be easily inserted in and withdrawn from the bearing 25, which bearing journals the inner end of the shaft, so that the shaft is journaled at both ends of the gear train, as distinguished from the construction of similar tools in which the arrangement of the gear train is such that the same is carried by a shaft supported at one end only. It will be seen that when the gear housing is secured to the motor casing in operative position the gears are automatically maintained in meshed operative position due to their arrangement, and no special means is required to hold said gears in operative position. It will also be seen that, by virtue of this arrangement of the gear train, the compound gear carried by the shaft 18 will rotate in the same direction as the gear 26 and the shaft, and consequently the variation in speed and the friction between the compound gear and the shaft will be reduced to a minimum.

It will be observed from the foregoing that the provision of a unit readily attachable and detachable to and from the motor casing, said unit comprising a spindle shaft, gear train, and housing therefor, permits the inspection of the unit parts, their lubrication and replacement or repair to be readily and speedily accomplished without disturbing the motor assembly, and that the coupling between the motor and said gear train, as well as the bearing for the inner end of the spindle shaft, is established by the simple bringing together of the cooperating parts, and maintained in proper operative relation solely by the assembly effected between the gear housing and the motor casing.

The invention having been set forth, what is claimed as new and useful is:

1. In a motor driven tool, the combination with a motor casing, a motor mounted in said casing, of a gear housing carried by the motor casing, a shaft journaled in said housing, and a gear train disposed in said housing and driven by said motor, one gear of said train being mounted on said shaft for rotation independent of and in the same direction as said shaft.

2. In a motor driven tool, the combination with a motor casing, a motor mounted in said casing, a pinion mounted on said motor shaft, a gear housing detachably mounted on said motor casing, a shaft journaled in said housing, a stud carried by said housing, a gear train mounted on said shaft and stud and driven by said pinion, one gear of said train being mounted on said shaft for rotation independent of and in the same direction as said shaft.

3. In a motor driven tool, a motor casing, a motor mounted in said casing, a pinion carried by the motor shaft, a bearing mounted in one end of said motor casing, a gear housing detachably mounted on said motor casing, a shaft journaled in said housing and having its inner end journaled in said bearing, and a gear train carried by said housing, one gear of said train being mounted on said shaft for rotation independent of and in the same direction as said shaft.

4. In a motor driven tool, a motor casing, a motor carried by said casing, a pinion mounted on the motor shaft, and a gear train assembly carried by the motor casing and removable as a unit, said assembly comprising a housing carried by the motor casing, a shaft journaled in said housing, a stud carried by said housing, and a gear train carried by said shaft and stud and driven by said pinion, said shaft projecting rearwardly and having its end journaled in a bearing in the end of the motor casing.

In testimony whereof I affix my signature.

THEOBALD C. WEISS.